United States Patent
Vives et al.

(10) Patent No.: US 7,042,589 B2
(45) Date of Patent: May 9, 2006

(54) INKJET PRINTING AND METHOD

(75) Inventors: Juan Carles Vives, San Diego, CA (US); Jui-Tong Tan, Chieftain, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 25 days.

(21) Appl. No.: 10/665,868

(22) Filed: Sep. 19, 2003

(65) Prior Publication Data

US 2004/0061878 A1 Apr. 1, 2004

Related U.S. Application Data

(63) Continuation of application No. 09/543,209, filed on Apr. 5, 2000, now Pat. No. 6,825,951.

(51) Int. Cl.
*G06F 15/00* (2006.01)

(52) U.S. Cl. .................. 358/1.16; 358/1.15; 358/1.9

(58) Field of Classification Search ............... 358/532, 358/1.16, 1.15, 1.9, 434, 405; 347/68, 70, 347/71

See application file for complete search history.

(56) References Cited

U.S. PATENT DOCUMENTS

| 5,838,888 | A | * | 11/1998 | Oda ........................ 358/1.16 |
| 6,079,820 | A | * | 6/2000 | Dijksman et al. ............ 347/68 |
| 6,462,832 | B1 | * | 10/2002 | Malik ....................... 358/1.15 |

* cited by examiner

*Primary Examiner*—Twyler M. Lamb

(57) ABSTRACT

An inkjet printer includes a print formatter circuit which receives high-level printing signals from a host computer, such as a PC or mainframe computer. The print formatter circuit translates the high-level printing signals into signals of an intermediate-level interface language, which is communicated to a printhead controller circuit. The printhead controller circuit in turn translates the intermediate-level interface language signals into discreet-event commands, and other finite action-element or condition-element signals or requirements, that are communicated to the inkjet printer and to a printhead in the printer. The discreet-event commands, finite action-element, and finite condition-element signals effect control of the movements of a carriage of the printer, or print medium movable past the carriage, and the actions of an inkjet printing cartridge carried in the carriage such that ink or other printing fluid is controllably ejected from the printing cartridge onto the print medium to form images or characters.

20 Claims, 6 Drawing Sheets

| SIGNAL | WIDTH | PURPOSE |
|---|---|---|
| 68 — TT | 3 | INFORMS PHC OF TYPE OF DATA TRANSFER |
| 70 — nStr | 1 | INFORMS PHC THAT DATA IS AVAILABLE TO STROBE IN |
| 72 — nAck | 1 | USED BY PHC TO ACKNOWLEDGE EACH SUCCESSIVE BYTE OF DATA |
| 74 — AD | 8 | BIDIRECTIONAL MULTIPLEXED ADDRESS/DATA BUS |
| 76 — IRQ | 1 | USED BY PHC TO INTERRUPT FORMATTER |
| 78 — Enc | 2 | PROVIDES PHC WITH ENCODER PULSES (SCHMIDT TRIGGER INPUTS) |
| 80 — DataReq1 | 1 | USED BY PHC TO REQUEST PRINT DATA FOR PH# 1 (CAN BE PROGRAMMED TO REQUEST DATA FOR EITHER PH) |
| 82 — DataReq2 | 1 | USED BY PHC TO REQUEST PRINT DATA FOR PH# 2 |

FIG.5

| TT[1:0] | DEFINITION |
|---|---|
| 84 — 000 | REGISTER ADDRESS |
| 86 — 001 | REGISTER WRITE DATA |
| 88 — 01X | REGISTER READ |
| 90 — 101 | FIRST BYTE OF 32 BYTE BLOCK PH #1 PRINT DATA |
| 92 — 100 | BYTES 2-32 OF PH #1 PRINT DATA BLOCK |
| 94 — 111 | FIRST BYTE OF 32 BYTE BLOCK PH #2 PRINT DATA |
| 96 — 110 | BYTES 2-32 OF PH#2 PRINT DATA BLOCK |

FIG.6

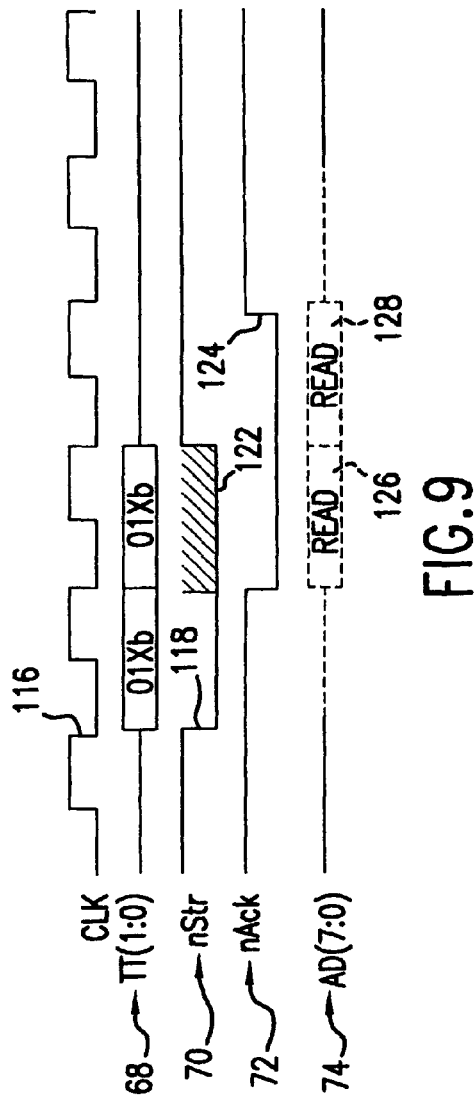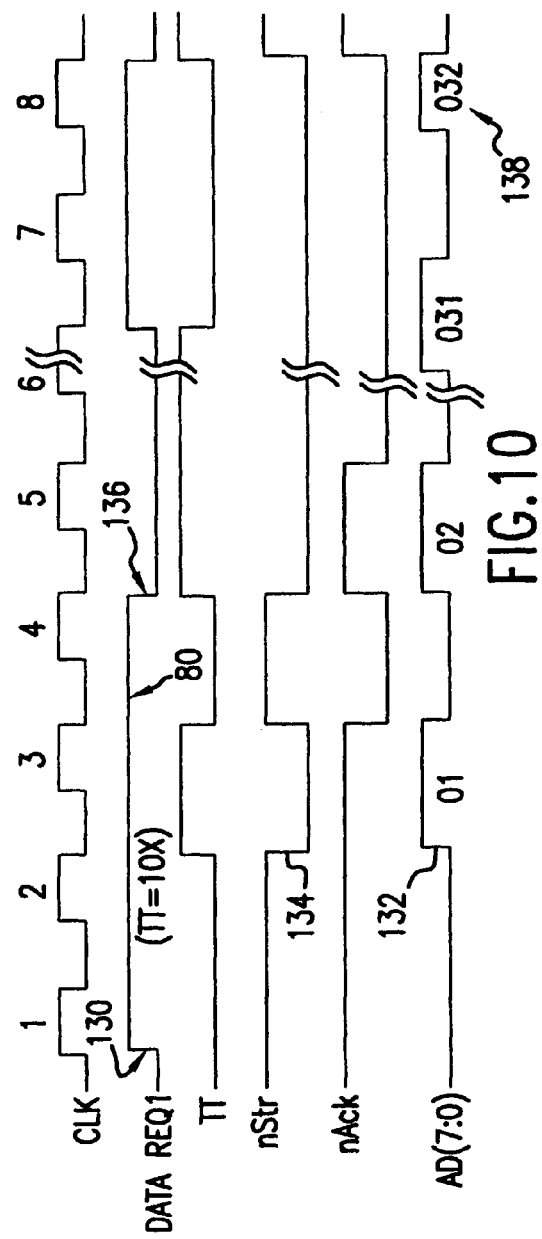

| BYTE → | 0 1 2 3 4 5 6 7 8 |
|---|---|
| 1 | 9–16 |
| 2 | 17–24 |
| 3 | 25–32 |
| 4 | 1–8 |
| 5 | 9–16 |
| 6 | 17–24 |
| 7 | 25–32 |
| 8 | |
| 30 | 17–24 |
| 31 | 25–32 |
| 32 | 33–40 |
| 33 | 41–48 |
| 34 | 49–56 |
| 35 | 57–64 |
| 510 | 497–504 |
| 511 | 505–512 |

NOZZLE ↓

INKJET PRINTING AND METHOD

The application is a Continuation of U.S. application Ser. No. 09/543,209 filed Apr. 5, 2000, now U.S. Pat. No. 6,825,951 the specification of which is incorporated herein by reference.

BACKGROUND OF THE INVENTION

1. Field of the Invention

This invention relates generally to inkjet printing. More particularly, this invention relates to a method used to control one or more printheads in an inkjet printer, and to an inkjet printer utilizing this method.

2. Related Technology

Inkjet printers or plotters typically have a print cartridge mounted on a carriage. This carriage is traversed back and forth across the width of a print medium (i.e., usually paper or a plastic plotting film, for example) as the print medium is fed through the printer or plotter. Plural orifices on the print cartridge are fed ink (or other printing fluid) by one or more channels communicating from a reservoir of the print cartridge. Energy applied individually to addressable resistors (or other energy-dissipating elements, for example, to piezoelectric actuators), transfers energy to printing fluid; which is within or associated with selected ones of the plural orifices. These orifices then eject printing fluid onto the printing medium.

Presently, it is conventional that when a new printhead technology is developed older printers are replaced with new printers that are able to use the new printhead technology. This is due to the conventional practice of using a control circuit in conventional printers that is a print formatter and printhead controller circuit. This control circuit, which is of a proprietary nature to each printer or family of printers, receives high level printing signals, and produces the control signals necessary not only to control the actions of the printer (i.e., movements of the print medium, and of the printhead carriage relative to this medium), but also controls the actions of the print cartridge itself. Thus, no two printer models, or only a family of printer models, even those manufactured by the same company, are compatible and can use printheads interchangeably. Theretofore it has not been practical to update existing printers with new printheads of new and improved technology because the new printhead would require control signals that simply could not be provided by the old formatter and printhead controller circuit.

Viewing now PRIOR ART FIG. 12, it is seen that in a conventional ink jet printer 500, all of these actions of the printer are controlled by a combination print formatter and printhead controller circuit 502; which receives high-level printing signals and printing data (represented by arrow 504), and transforms this high-level printing signals and data from the high-level language of the host computer (or other printing data source—not shown in the drawing Figures) into those discreet-event commands which control not only the firing sequence of the orifices of a printhead (i.e., the printing fluid ejection events) but also the position of the printhead(s), the movement of paper or other printing medium through the printer, etc.

Viewing FIG. 12 in greater detail, it is seen that a communication channel 504 (i.e., a printer cable, for example) exists between a sending device or other originator or source of high-level printing data and signals (such as a personal computer or other host computer system), and a conventional printer 500 having a combination print formatter and printhead controller circuit 502. The communication channel 504 facilitates the communication of the high-level printing signals 502 to the printer 500. This communication channel 500 may be a direct linkage between the host system and the print formatter and printhead controller circuit 502, or the communication channel may be effected through intermediate devices, such as a network print server, or the printer 500 may simply include a memory cache such as is incorporated into many conventional printing devices (i.e., a print buffer). That is, some part of, or all of the high-level print data and signals may be uploaded and stored in a print buffer memory cache until the combination print formatter and printhead controller circuit is ready to receive this communication. The print formatter and printhead controller circuit 502 then translates the signals 500 sent by the host system into a set of instructions that are conveyed to a printheads 506 of the printer 500 in a two way communication steam 508 such that the printhead 506 receives all necessary data for performing the print job and reports back such things as current position (i.e., horizontal and vertical position relative to the print medium), printhead temperature, and possibly an array of error messages to the control device, so that not only may the print formatter and printhead control circuit 502 keeps track of the position of the printhead 506, but also corrective action may be taken if any problems arise.

A long-standing challenge and deficiency in the manufacturing of such conventional inkjet printers 500 has been that when new improved printheads are developed and come on the market there is no easy or practical way to upgrade existing printers to utilize the new technology. This is the case because the print formatter and printhead controller circuit is able to provide control signals only for a particular one or limited family of printheads. As new printhead technology and new printheads become available, they require control signals that the print formatter and printhead controller circuit 502 cannot provide.

SUMMARY OF INVENTION

In view of the deficiencies of the related technology, an object for this invention is to reduce or overcome one or more of these deficiencies.

One or more of the objectives of this invention may be realized through a method of communication between a print formatter circuit and a printhead controller circuit which utilizes selected codes and algorithms. The information of how to convert the selected codes and algorithms to the discreet action commands required by a particular printhead is embedded in an ASIC chip or chipset. This ASIC chip or chipset may be specific to a single printhead, or to a family of printheads. This method will allow utilization of different printhead types in a printer at different times.

Further, the present invention provides for a printer to have a printhead controller circuit which is a separate circuit from a print formatter circuit, and that the printhead controller circuit will have the means to determine if the type of printhead currently in the printer is compatible with the current instruction set.

Accordingly, in view of the above, it is seen that the present invention makes it possible to diminish or eliminate the conventional problems relating to printer and printhead upgrades by providing a method and apparatus by which a printer may be altered in an economical fashion to adapt to, communicate with, and utilize any new applicable printhead. A new printhead controller circuit (i.e., and ASIC chip or chipset) may be inserted into the printer, and the new printhead will then be controlled by the print formatter circuit via this new printhead controller.

The present invention provides a method and apparatus for providing communication between the formatter of a printer and a printhead; which will allow for the adaptation of multiple printhead types with little alteration of the printer hardware. This new printer communication interface or protocol will function with an application specific integrated circuit chip (i.e., an ASIC) which is easily changed in and out of the printer.

Such an ASIC is an integrated circuit chip or chipset with application specific instructions built into it which relate to each and every function necessary for the control of a printhead (or plural printheads). The above mentioned instruction set includes directives such as those relating to the multiple functions of the printer mechanism. Some of the more common functions for a printhead controller are listed below:

1. Power supply sequencing; which provides control signals and timing for properly controlling the various power supplies during printhead power up and power down;
2. Reset sequencing. This is a signal or group of signals sent by the printhead controller for the purpose of resetting the printhead(s);
3. Continuity testing: an analysis performed by the system to ensure full control of the printhead;
4. Spitting or printing nozzle activation due to user-selectable nozzle and frequency settings; which may be repeated for a user-selectable number of times;
5. Thermal management; the management of printhead warm up and temperature management during printing;
6. Firing and data sequencing processes for generating printhead firing pulses and sequencing of printhead nozzle alignment variations;
7. Printhead status and control register read and write. These are methods utilized by the printhead controller for reading the current position and status of the printheads and means for supplying the necessary instructions to the printheads. This is accomplished by utilizing the registers for reading and writing data to and from the printhead, and for making necessary corrections.

Other objects, features, and advantages of the present invention will be apparent to those skilled in the pertinent arts from a consideration of the following detailed description of a single preferred exemplary embodiment of the invention, when taken in conjunction with the appended drawing figures, which will first be described briefly.

BRIEF DESCRIPTION OF THE DRAWING FIGURES

FIG. 1 is a diagrammatic side elevation view of an inkjet printer; which utilizes the exemplary means embodied in this invention to control the printing functions of an inkjet print cartridge;

FIG. 2. illustrates the relationship between hardware modules of the printer seen in FIG. 1, and show a print formatter and printhead controller utilize a printhead to effect printing operations;

FIG. 5 is a table depicting one aspect of the communication interface between the print formatter, the printhead controller, and the printheads;

FIG. 6 is a table depicting the five main data transfer types utilized in the communication interface between the print formatter and the printhead controller, and between the printhead controller and the two printheads;

FIG. 9 depicts a register read cycle, and demonstrates how the various data lines operate in conjunction with the clock pulses;

FIG. 10 illustrates a typical printhead data transfer;

Figure 4:
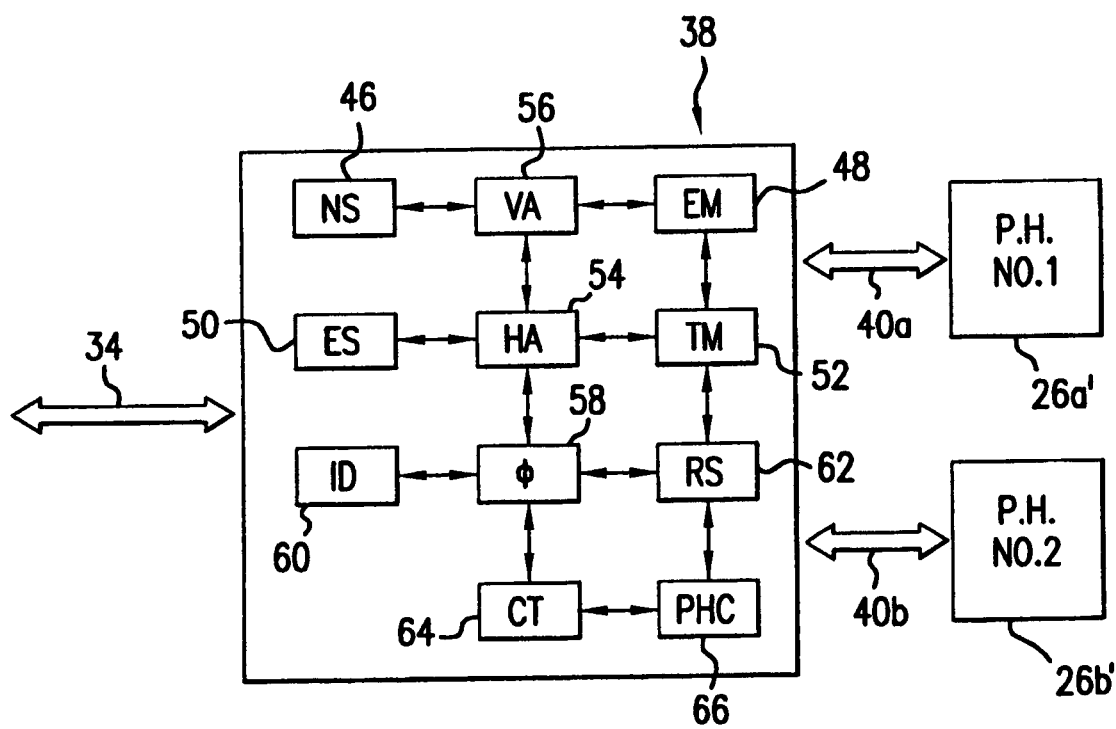
FIG. 4 is a more detailed illustration of one of the hardware modules seen in FIG. 2, and provides a graphical depiction of an ASIC chip with the multiple instructions, control algorithms, and functions which are resident within the ASIC chip.
Figures 11, 12:
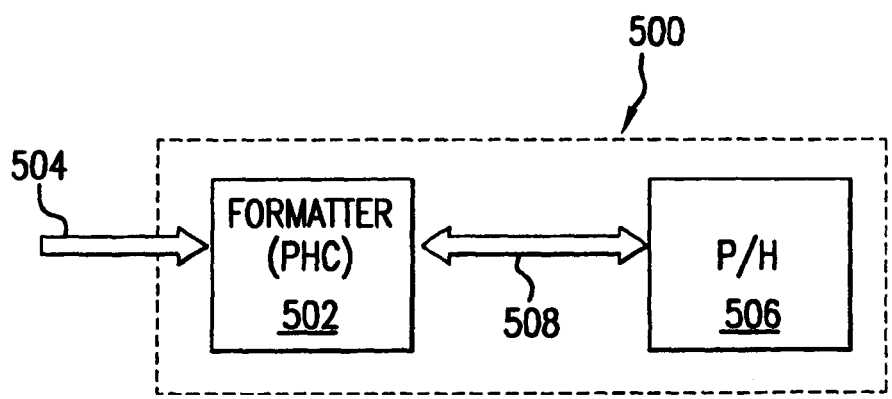

FIG. 11 demonstrate the process utilized in filling the memory data block of the ASIC seen in FIG. 4 in order to control all of the print nozzles in a single printhead.

FIG. 12 is a pictorial depiction of a conventional printer with a print formatter and printhead controller circuit utilizing conventional technology and architecture.

DETAILED DESCRIPTION OF A PREFERRED EXEMPLARY EMBODIMENT OF THE INVENTION

Figure 1:
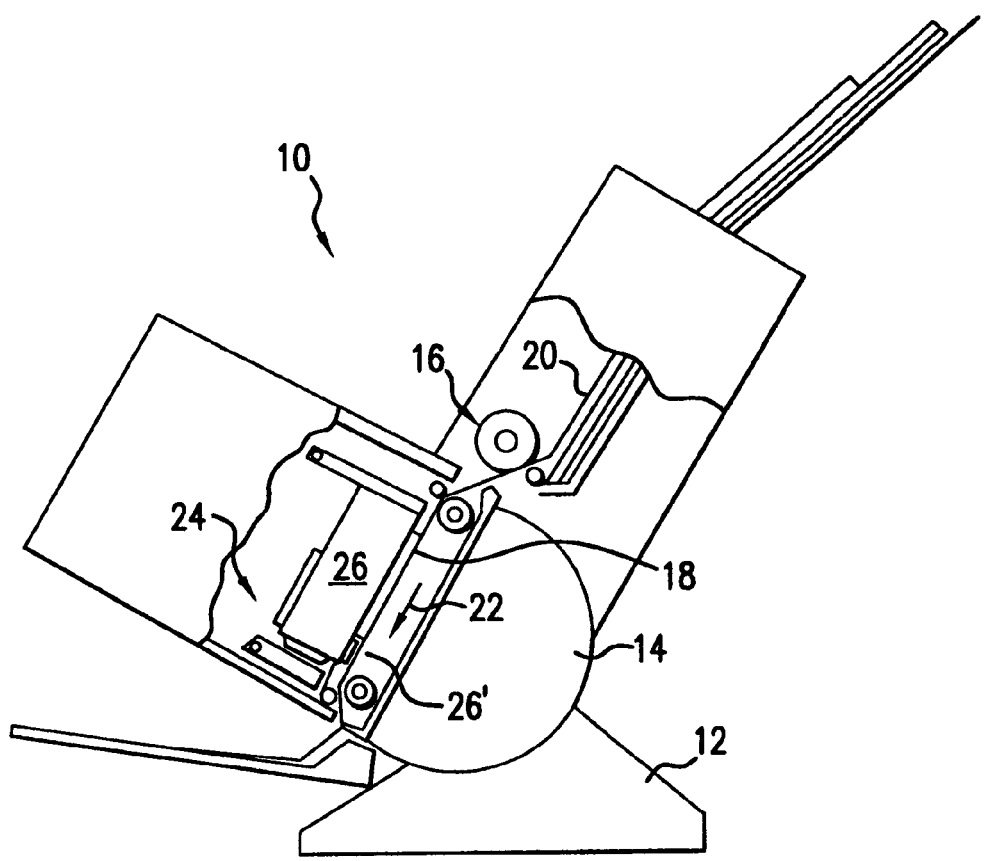

FIG. 1 shows an exemplary inkjet printer 10. This printer 10 includes a base 12 carrying a housing 14. Within the housing 14 is a feed mechanism 16 for controllably moving a print medium (i.e., paper this case, although the invention is not so limited) through the printer 10. Those ordinarily skilled in the pertinent arts will understand that the feed mechanism 16 may be configured to feed sheet paper or medium, or may be configured to feed fan-fold, or roll paper or medium, or may be configured to feed print medium of another shape or style. In this exemplary printer 10, the feed mechanism 16 controllably moves a single sheet of paper 18 from a paper magazine 20 along a print path 22 within the printer 10. The printer 10 includes a traverse mechanism 24 (i.e., a carriage) carrying an inkjet print cartridge 26. The traverse mechanism moves the inkjet printing cartridge 26 perpendicularly to the direction of movement of the paper 18 (i.e., the cartridge 26 is moved perpendicularly to the plane of FIG. 1). The printer 10 uses the inkjet printing cartridge 26 to controllably place small droplets of printing fluid (i.e., ink, for example) from the inkjet printing cartridge 26 on the paper 18. By moving the inkjet printing cartridge 26 repeatedly back and forth across the paper 18 as this paper is advanced by the feed mechanism 16 characters or images may be controllably formed by ejection and placement on the paper 18 of many small droplets of ink from the cartridge 26. These small droplets of ink are ejected in the form of ink jets impinging on the paper 18 in controlled locations to form the desired characters and images, as will be well known to those ordinarily skilled in the pertinent arts. The cartridge 26 includes a printhead 26', which is provided with a plurality of fine-dimension orifices 28 (best seen in FIG. 3), and from which printing fluid is controllably ejected, as will be understood by those ordinarily skilled in the pertinent arts. Those ordinarily skilled will also recognize that the printer 10 may include more than one inkjet printing cartridge 26 (referenced with the numeral 26 having an alphabetical character added) which are carried in one or more carriages 24 (similarly referenced), as will be further explained.

Figure 2:
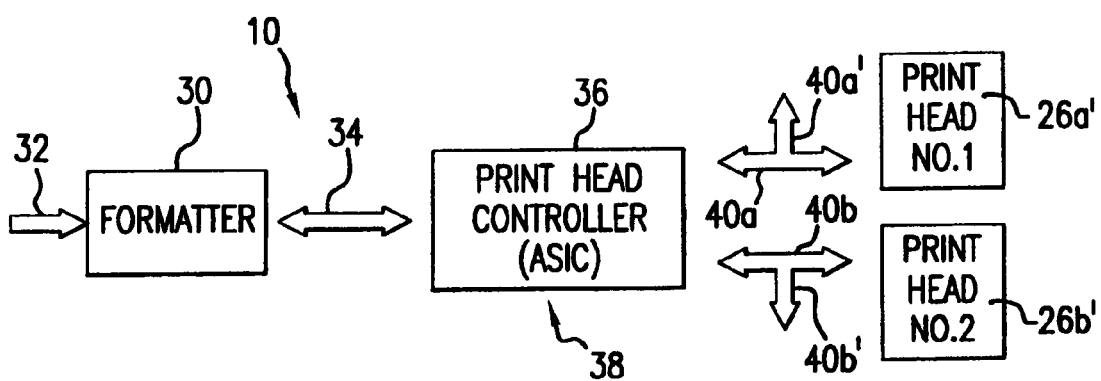

In overview, and as is illustrated diagrammatically in FIG. 2, according to the present invention, the printer 10 includes a print formatter circuit 30 which receives high-level printing signals 32 from a host computer or other source of these printing signals (not shown in the drawing Figures). The print formatter circuit 30 translates the high-level printing signals 32 into an intermediate-level interface language (indicated by arrows 34), and communicates this intermediate-level interface language with a printhead controller circuit 36. As will be further explained, the communication 34 is bi-directional.

Again, the communication of printing signals 32 between the sending device (such as a personal computer or other host computer system) and the print formatter circuit 30 may be accomplished by use of a direct linkage between the host system and the print formatter circuit 30, or the connection may be through an intermediary device (such as a network print server or a data cache print buffer memory) as is incorporated into many printing devices. Printing data may be uploaded and stored in such a data cache until the print formatter circuit 30 is ready to receive it. The print formatter circuit 30 then translates the high-level printing signals from the host computer system into a set of instructions that are conveyed to the printhead controller 36. This printhead controller 36 most preferably contains or includes an application specific integrated circuit (ASIC) chip or chip set 38, as seen in FIG. 2, and as is more particularly illustrated in FIG. 4.

Returning to a further consideration of FIG. 2, it is seen that the printhead controller 36, by using a particular combination of instruction sets, algorithms, and functions resident in the ASIC chip 36a operates on the intermediate-level interface language 34 received from the print formatter circuit 30 to responsively formulate and provide discreet-event instructions which it then communicates to a print head 26'a or 26'b (i.e., in this case, the printhead controller may feed instructions to two printheads), by means of a communication interface or connection 40a or 40b. It is seen in FIG. 2 that the communication interfaces 40a and 40b each include a respective branch 40a' and 40b' which is a communication to and from the printer 10 for such things as lateral movements of the carriages 24, and advancing the print medium or paper movements. In this way the printheads 26a/26b and printer 10 receive all necessary instructions for performing a print job. (i.e. firing sequence of the printhead orifices 28, required lateral position of the carriages 24a/b carrying the printing cartridges 26a and 26b, and printhead 26'a/26'b, paper movements along path 22, etc.).

The communications 40a and 40b are bi-directional, so that the printheads 26'a, 26'b, and printer 10 can be interrogated about or report back to the printhead controller circuit 36 information about such parameters as current lateral position of the carriages 24, printhead orifice temperature, and a variety of possible error messages so that not only may the printhead controller circuit 36 keep track of the position of the printheads 26', but corrective action may also be taken if any problems arise.

Figure 3:
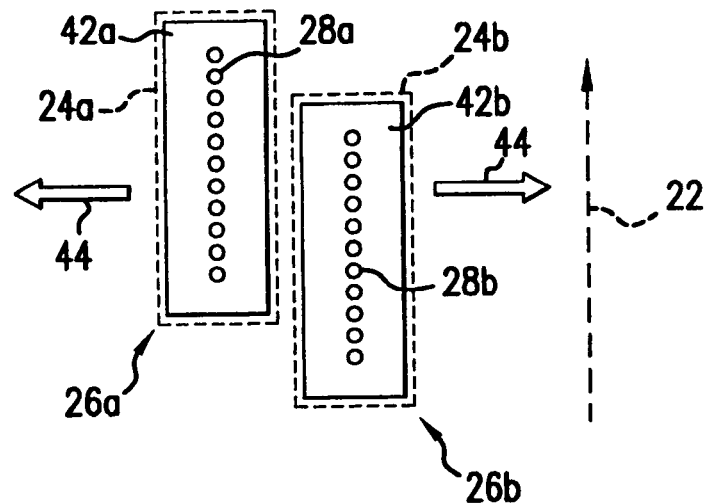
FIG. 3 depicts two printheads moving relative to a print medium (i.e., paper, for example) as this paper progresses through the printer so that printing can take place on the paper.

In order to further clarify the printing operations carried out by the printheads 26'a and 26'b, attention now to FIG. 3 will reveal a diagrammatic representation of two orifice plates 42a, 42b, respectively carried by printheads 26a, 26b, on carriages 24a, and 24b (i.e., the printer 10 in this case having two carriages 24, which are independently movable).

As is seen in FIG. 3, the orifice plates 42a and 42b each define a respective plurality of ink ejection orifices 28a and 28b, from which minute jets of ink or other printing fluid are controllably ejected. In order to controllably form images and printing characters by use of the minute jets of ink ejected from the orifices 28a and 28b, the carriages 24a and 24b (along with printing cartridges 26a and 26b, and their printheads 26'a, and 26'b) are laterally movable together and simultaneously, as is indicated by arrows 44. Similarly, the printer 10 moves the print medium along path 22 under the control of the print head controller circuit via branch communication interfaces 40a and 40b. The print medium 18 is most usually moved in a step-wise manner perpendicularly to the direction of traversing of the printheads 26'a and 26'b, as is suggested by the dashing of arrow 22 in FIG. 3. By controlled motion of the print medium 18, the printheads 26, the print medium 18, and the timing of the ink ejections from the orifices 28a, 28b, characters or images can be selectively formed on the print medium 18.

FIG. 4 illustrates ASIC chip 38 in greater detail, showing that this circuit chip has multiple instructions, algorithms, and functions resident within the chip. This depiction is meant to demonstrate the location and function of the various instructions contained in this chip; however the actual ASIC chip 34 need not be limited by this depiction. Among the basic instructions, algorithms, or functions relating directly to the print heads 26'a, and 26'b are: Nozzle_select, Energy_management, Encoder_signal, and Temperature_management.

Nozzle_select (indicated by numbered box 46 on FIG. 4) is the function and method by which the printhead controller circuit 36 informs a printhead 26'a or 26'b which one or ones of the plurality of respective nozzle(s) 28a or 28b are to fire (i.e., eject a minute jet of printing fluid or ink) at any given moment and position of the respective printhead. Energy_management 48 is the function and method by which the printhead controller circuit 36 regulates the amount of power (i.e., wattage) received by a particular resistor or other energy dissipation element associated with a selected one of the plural nozzles 28a or 28b so that it has the proper power level to eject the appropriate amount of ink as a minute jet in order to produce the desired effect on the paper or other print medium 18. The Encoder_signal 50 is the function and method utilized by the Printhead controller circuit 36 to locate the lateral position and direction of movement of a particular print head 26'. In this case, the encoder signal function receives an input from two separate encoders, each of which is associated with the carriages 24a, 24b, and which are arranged to provide a quadrature signal (i.e., each being phase shifted relative to the other, and the leading or lagging phase relationship indicating direction of motion) in order to provide a horizontal position and direction of movement input signal to the printhead controller circuit 36.

Temperature_management 52 is the function and method used by the printhead controller circuit 36 to monitor the temperature of the printhead(s) 26'a, 26'b in order to assure that they do not overheat and fail. This instruction algorithm has the ability to decrease the speed of or even momentarily terminate print nozzle 28 firing. Temperature of the printheads 26'a and 26'b may be sensed, for example, by use of a dedicated resistor, or temperature sensing element embedded at each printhead. This temperature sensing element will be interrogated by the printhead controller in order to provide a temperature indication to the print head controller portion 52.

Other functions, instructions, or algorithms resident on the ASIC chip 38; which relate to the position of the printheads 26'a and 26'b in relation to the print medium 18 are Horizontal_alignment, Vertical_alignment, and Timing_control. Horizontal_alignment 54 is the function and method by which the printhead controller 36 directs the traverse mechanisms 24 to laterally align the printhead 26a or 26b on the paper or other print medium 18.

Vertical_alignment 56 is the function and method through which the printhead controller 36 directs the feed mechanism 16 of the printer 10 to align the paper or other print medium 18 at a particular location along the printing path 22 so that the print medium is in the proper location in respect to a selected one or ones of the plural orifices 28a, 28b of the printhead(s) 26 at the moment an ink jet is ejected to the print medium. Timing_control 58 is the function and method by which the printhead controller 36 synchronizes the movements of the paper feed mechanism 16, the traverse mechanism 24 carrying the printhead(s) 26, the moment of ink ejection, and all other printing events.

Other functions, algorithms, and instructions resident on the ASIC chip 38 are Printhead_identifier, Reset_sequencing, Continuity_testing, and Printhead_cleaning. Printhead_identifier 60 is the function and method utilized by the printhead controller circuit 36 to identify the particular printhead(s) presently in the printer 10. This function is used to assure that the correct instruction set is being used in conjunction with that particular printheads 26. Reset_sequencing 62 is the function and method utilized by the printhead controller circuit 36 to reset the printhead(s) 26 if and when it becomes necessary to do so. Continuity_testing 64 is the function and method used to insure that the interface between the printhead controller circuit 36 and the printhead(s) 26 is electrically good and stable. Those ordinarily skilled in the pertinent arts, will recall that printing cartridges, such as cartridges 26 generally have an array of electrical contacts which must may reliable contact with a similar array on the carriages 24 in order for the print cartridges 26 to function correctly. The function 64 is utilized following a printing cartridge change to test and validate the continuity of every one of the electrical contacts between the printing cartridges 26 and the printer 10 (i.e., via connection in carriages 24).

Printhead_cleaning 66 is the function and method by which the printhead controller circuit 36 may be instructed to clean the nozzle orifices 28 of the printheads 26', and responsively instructs the printhead(s) 26' to fire bursts of ink jet ejections, of pre-determined strength and intensity through each nozzle 28. This cleaning function may be used, for example, to break loose any blockage present at one of the orifices 28. This blockage may have been caused by dried ink, for example.

Figure 8:
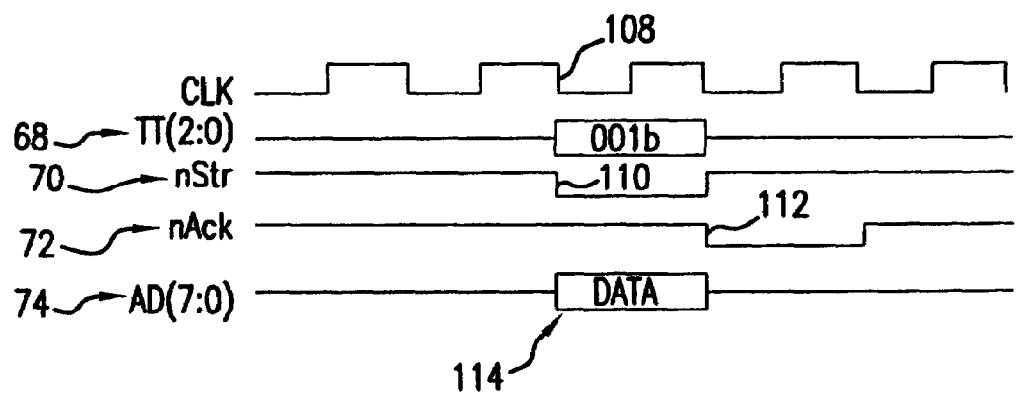
FIG. 8 depicts a typical register data write cycle, and demonstrates how the various data lines operate in conjunction with the clock pulses.

FIG. 5 depicts an aspect of the intermediate-level communication interface 34 between the print formatter circuit 30, the printhead controller circuit 36, and the printheads 26. In FIG. 8 are listed each of the eight major communication lines or busses, the signal bit-width, and the purpose served by each signal in conjunction with such communications 34. It will be understood that each "bus" may include a single signal conductor, or a group of such conductors. In summary these eight major communication types or mediums as part of the intermediate-level communication interface 34 are: the "Transfer Type" (TT) bus, the "nStr" buss, "nAck" bus, "control data" bus (AD), "IRQ" bus, "Enc" signal bus, "DataReq1", and "DataReq2". As can be appreciated by these terms used to identify the communication types or mediums of the intermediate-level communication interface 34, some are conventional elements. For example. "IRQ" is a conventional notation for an interrupt request. The "Str" and "Ack" notations stand for "strobe" and "acknowledge," respectively. The "AD" notation stands for "address/data," and indicates that this bus can carry either type of information. These different communication types or mediums and their function will be further explained in the paragraphs that follow.

The Transfer Type or "TT" bus 68 communication has a bit-width of three bits and is the line of communication through which the print formatter circuit 30 informs the printhead controller circuit 36 (including ASIC 38) that a printing event is about to take place and what kind of data will be in a data packet soon to be sent from print formatter circuit 30 to printhead controller circuit 36.

The "nStr" communication 70 has a bit-width of one bit and is the communication channel asserted by the print formatter circuit 30 in conjunction with dispatching a data packet (as will be further described) in order to inform the printhead controller circuit 36 that a print data portion of the intermediate-level communication interface 34 is available to be strobed in.

The "nAck" communication 72 has a bit-width of one bit, and is the pathway along which a signal of acknowledgement is sent from the printhead controller circuit 36 back to the print formatter circuit 30 in order to confirm receipt of data.

The control data bus ("AD") 74 has a bit-width of eight bits. "AD" is the main data bus used in the intermediate-level communication interface 34. The main function of "AD" in this context is to convey the actual packets of addresses and of data from the print formatter circuit 30 to the printhead controller circuit 36.

The "IRQ" 76 communication type has a bit-width of one bit and is the communication medium utilized by the printhead controller circuit 36 to request that the print formatter circuit 30 interrupt or temporarily stop or alter the sequence of events taking place. For instance once the printhead(s) 26 reach a print zone (i.e., an area on the print medium 18 at which ink jets are to be ejected) then they must receive top priority for management of the timing, volume of ink ejected, number of ink jet ejections, etc., that are to be effected at a particular print zone. At the moment of receiving the "IRQ" 76 signal, the printhead controller 36 will may interrupt all other communication in order to assure that sufficient bit-width be available to prevent the printhead(s) 26 from being starved for data.

The "Enc" signal 78 has a bit-width of two bits. "Enc" provides the printhead controller circuit 36 with encoder pulses in order that the printhead controller circuit 36 can track the location and direction of movement of the printer carriages 24.

"DataReq1" 80 and "DataReq2" 82 each have a bit-width of one bit. These two signals are the communication types or mediums through which the printhead controller circuit 36 requests data for a respective one of the printhead 26'a or 26'b from the print formatter circuit 30. If "Datareq2" in not enabled (i.e., because although the printer 10 may have two carriages 24, only one may be carrying a printing cartridge as some times), then the printhead controller circuit 36 may utilize either one of these mediums to request data for the printhead 26'a. In other words, "DataReq2" 82 is a secondary signal with a one bit bit-width; which can be utilized by the printhead controller circuit 36 to request print data for the second printhead 26'b when two printheads 26'a and 26'b are installed, and can otherwise be used to serve a single printhead when only one is present in the printer 10. If "DataReq2" 82 is enabled then it will be utilized by the print formatter circuit 36 only for requesting transference of addresses and printing data relating to printhead 26'b. In that case, "DataReq1" 80 will be utilized for service to printhead 26'a only.

FIG. 6 tabulates the five main "TT" data transfer types or mediums utilized in the intermediate-level communication interface 34 between the print formatter circuit 30 and the printhead controller circuit 36, and also between the printhead controller circuit 36 and the two printheads 26'a and 26'b. Each "TT" data transfer type or medium indicated in the table of FIG. 6 has a three bit length (i.e., consistent with the "TT" definition of FIG. 5, although the lease significant bit may be a "don't care" bit, indicated by an "X" in the table of FIG. 6) and has particular sequencing and timing requirements. In particular, these data transfer types are: the "Register address" 84; which informs the printhead controller circuit 36 where (in terms of memory addresses) forthcoming data elements are to be stored. "Register write," 86 is an instruction to the memory register of the printhead controller circuit 36 (which is preferably not a part of the ASIC 38) to accept a data packet. "Register read," 88 signals an act of an entity such as the print formatter circuit, or other device reading or extracting data from the register. For example, any one of the functional elements of the ASIC 38 described in connection with FIG. 4 may need to access (i.e., read) data in order for that functional element to responsively perform its function, algorithm, or to provide the required instruction.

Next in the tabulation of FIG. 6 list is a pointer 90 (entitled, "First byte of 32 byte block Pen1 Print Data") to the address of the first byte of a 32 byte block of data directed to printhead 26'a so that the printhead controller circuit 36 will know from which memory location to start reading.

Next in the tabulation of FIG. 6 is a pointer 92 to the beginning address of data to be accessed for the data read started by the pointer 90 entry. The pointer 92 is entitled, "Bytes 2–32 of Pen1 Print Data Block." The final two entries in this table of FIG. 6 (i.e., pointers 94 and 96) are respectively the same as the prior two pointers 90 and 92, except that they relate to the second printhead 26'b, rather than to the first printhead 26'a.

Considering next FIGS. 7–10 in conjunction with one another, it is seen that the timing diagrams of these Figures respectively depict (in sequence) the timing and signals utilized to effect: an address transfer to the printhead controller circuit 36, a data transfer to the printhead controller circuit 36, a data read operation, and a filling of a print buffer memory with printing data for one of the printheads, 26'a, or 26'b.

Figure 7:
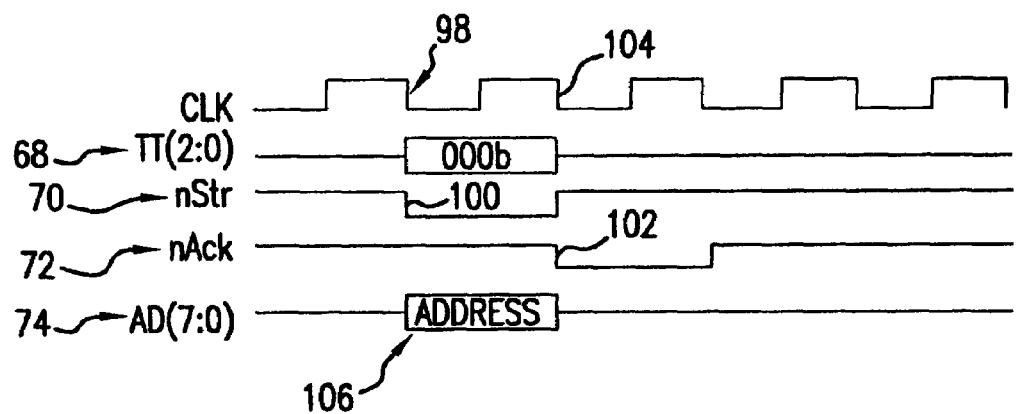
FIG. 7 depicts a typical register address cycle, and demonstrates how the various data lines operate in conjunction with the clock pulses.

FIG. 7 is a timing diagram for the first phase (address transfer) of a typical address and data transfer from print formatter circuit 30 to printhead controller circuit 36 as part of the mid-level communication interface 34. This timing diagram of FIG. 7 illustrates how the indicated data lines (recalling FIGS. 5 and 6) operate in conjunction with one another and according to the clock pulses provided by the print formatter circuit 30. In the timing diagram of FIG. 7 Transfer type (TT) bus 68 goes high on the trailing end of a clock cycle 98, and an address register "000" (i.e., signal 84, recalling FIG. 6) command is sent on the "TT" bus 68 in order to inform the printhead controller circuit 36 that a register address is ready to be placed on the "AD" bus 74 by the print formatter circuit 30. Before the print formatter circuit 30 places the address on the "AD" bus 74, it asserts "nStr" 70 (i.e., transition 100 from signal "high" to signal "low") for one clock cycle prior to the end 98 of the particular clock cycle. When the printhead controller circuit 36 receives the message on the "nStr" bus 70 it will then acknowledge the transaction by asserting "nAck" 70 (i.e., transition from signal "high" to signal "low" 102) on the following clock cycle. In the time interval from "nStr" 100 to "nAck" 102 (i.e., at the trailing edge of clock cycle 104), the address block 106 is sent on "AD" 74 bus, for completion of this transaction. It is noted that both the "nStr" and "nAck" signals are dithered back to their signal "high" condition in preparation for the next operation.

FIG. 8 is a depiction of a typical timing diagram for a register write cycle (i.e., data write). In this depiction the Transfer type (TT) 68 bus goes high on the trailing end of a clock cycle 108, and an data register write "001" (i.e., signal 86, recalling FIG. 6) command is sent on the "TT" bus 68 in order to inform the printhead controller circuit 36 that a data register write is ready to be placed on the "AD" bus 74 by the print formatter circuit 30. Before the print formatter circuit 30 places the data register write on the "AD" bus 74, it asserts "nStr" 70 (i.e., transition 110 from signal "high" to signal "low") for one clock cycle prior to the end 108 of the particular clock cycle. When the printhead controller circuit 36 receives the message on the "nStr" bus 70 it will then acknowledge the transaction by asserting "nAck" 70 (i.e., transition from signal "high" to signal "low" 112) on the following clock cycle. In the time interval from "nStr" 110 to "nAck" 112, the data register block 114 is sent on "AD" 74 bus, for completion of this transaction. Again, it is noted that both the "nStr" and "nAck" signals are dithered back to their signal "high" condition in preparation for the next operation. After each register write transaction the address will automatically increment.

FIG. 9 is a timing diagram depicting both a typical data register read cycle and an alternative form of register data read transaction. The print formatter circuit 30 first initiates a data register read cycle by setting the "TT" bus 62 to signal condition 88 (i.e., to "01x"), then strobes "nStr" 70, and stops driving the "AD" bus 74. As FIG. 9 shows, data register read will then be occur (i.e., read) on the following clock cycle 116 with "nStr" 70 asserted (transition to signal "low" at 118) at the same time. Signal "nAck" 72 is transitioned to signal "low" at 120 on the following clock cycle. Alternatively, the print formatter circuit 30 may request an additional "read" interval during this transaction, and achieves this by holding the "AD" bus at signal "01x" for an additional clock cycle (as is seen by the second occurrence of this signal condition in FIG. 9) and continuing to strobe "nStr" 68 at level "low" level for an additional clock cycle (see area 122 on FIG. 9) following the transition 118. In other words, the signal "nStr" is not yet dithered back to its signal "high" condition. As these events and this condition occurs, the contents of the first data register address 126 (and alternatively, the next data register address 128 sequentially as well), will also be returned (i.e., "read") to the printhead 26), along with a transition of the "nAck" signal 72 to its signal "high" value (transition 124) at the completion of this register data read transaction.

FIGS. 10 and 11 in conjunction depict how data is transferred to and stored in a buffer memory, as a matrix of printhead data. In this case, the printhead data is for the printhead 26'a, but the process is the same for printhead 26'b—although a different buffer memory is used, or separate portions of a single buffer memory are assigned to each of the printheads 26'a and 26'b. In each case, the printhead controller circuit 36 has requested data for a printhead (again, printhead 26'a in this example). Thus, the signal "DataReq1" 80 is asserted, indicated at 130 on FIG. 10. The "TT" signal can be of either type, "10x" or "11x" (i.e., indicating printing data for either print head 26'a, and for printhead 26'b, respectively—recalling the signal types of FIG. 6). In this case, signal "TT" is "10X", equivalent to signals "101", and "100" of FIG. 6, because the printing data is for printhead 26'a.

If the signal "Datareq1" 80 is asserted by the printhead controller, it can accept a 32 byte data block for printhead 26'a, and if the printhead controller asserts "DataReq2", then it can receive data for printhead 26'b. These two signals are asserted whenever there is a need for data for printhead 26'a or for printhead 26'b, in which case the printhead controller circuit 36 can accept a 32 byte block of data for the respective printhead.

The signal "DataReqx" ("x" standing in for either "1", or "2") remains asserted until the printhead controller circuit 36 detects the first byte of the printhead printing date register write block (recalling FIG. 8). This first byte detection is indicated at 132 of FIG. 10, and is occasioned by the "nStr" going signal "low," indicated at 134. Once the first byte of a data block has been transferred, the printhead controller circuit 36 continually determines whether another block of 32 bytes of data can be accepted. If so (i.e., a "true" answer to an inquiry), then "DataReqx" is asserted (signal "low"); otherwise it will be de-asserted (signal "high"). The result of this determination process is indicated at 136 of FIG. 10, prior to which a "true" determination has been made, and signal "DateReq1" has been toggled "high" in preparation to the signal "low" transition at 136. The signal "low" event at 136 allows the next successive date block "D2" to be strobed into the buffer memory for printhead controller circuit 36. The "DataReqx" state is evaluated by the print formatter circuit 30 wen it is not transferring data for use by one or the other of the printheads 26'a or 26'b. This process continues so long as the determination of whether the print buffer memory can accept another byte of print date comes up with a "true" determination. Importantly, when the print formatter circuit 30 transfers the $32^{nd}$ byte, shown at 138 in FIG. 10. if DataReqx is set, another block of data may be sent on the next clock cycle. This is the case, as will be seen, because the print buffer memory 140, indicated diagrammatically in FIG. 11, may have been dumped or cleared of its data (i.e., the date may have been used) since the last byte transfer of the preceding memory filling cycle. As a result, the print buffer memory may be ready to receive another group of print data transfers (i.e., print data transfers D1 through D32).

More particularly, viewing FIG. 11, data is transferred to print buffer memory of the printhead controller circuit 36 in 32 byte blocks for each of 512 printing orifices 28 of the particular printhead, in a matrix having a width of eight memory locations (i.e., memory addresses). In the event that a printing cartridge has a different number of printing nozzles on its printhead, then the configuration of the print buffer memory matrix illustrated in FIG. 11 is easily adjusted for this. That is, the ASIC 38 configured for a particular printing cartridge 26 will include instructions for reconfiguring the print buffer memory 140 according to the needs of the printing cartridge. As will be appreciated, this is one of the advantages of the present invention.

In the present example, with a printhead having 512 printing orifices, the data matrix 140 is filled as follows, viewing FIG. 11 (note that the nozzle number reads from top to bottom of the table, and the bit reads from 0 through 8 from left to right on the tabulation). That is, this Figures depicts a preferred method utilized by the intermediate-level communication interface 34 to transfer data byte-by-byte into the print buffer memory locations which, when they are read out and used, control the ejection of printing fluid from all of the printing orifices 28 of a printhead 26 for a single printing event.

Print data is transferred in 32 byte blocks (print data for 32 nozzles by 8 columns in the memory matrix). In a typical scenario, the first byte of the first block contains the first column of print data for nozzles 0 through 7 (8 nozzles), the second byte of the first block contains the first column of print data for nozzles 8 through 15 (8 nozzles); and so on until the fifth byte of the first block is transmitted, which contains the second column of print data for nozzles 0 through 7 (8 nozzles). The thirty-third byte transmitted is then the first byte of a second block and will contain the first column of print data for nozzles 32 through 39 this pattern continues all the way to the $512^{th}$ byte which contains the eighth column of print data for nozzles 505 through 512. All bytes are transferred with the MSB corresponding to the lowest numbered nozzle for that byte (e.g. bit 7 of the first byte corresponds to nozzle 1) This scenario changes depending on the current values of parameters, which may be arbitrarily called "FirstPrintNoz" and "PrintWinsize", which are set by the ASIC 38, and in which case the first byte contains the first column of print data for nozzles FirstPrintNoz to FirstPrintNoz +7 and continues on until a determined number of bytes (for example, until PrintWinsize bytes) have been transmitted.

An advantage of the present invention resides in the ability to replace (in a printer having the illustrated inventive architecture), both the printing cartridges 26, and the ASIC 38. The result is that as new printing cartridges become available, then they may be med in the inventive printer, by providing also a corresponding new ASIC 38 (having a functional, instructional, and algorithm set as required, recalling FIG. 4). This change in the printer 10 to a new printing cartridge, and to a corresponding new ASIC 38 allows the print formatter 30 to output the same mid-level printing interface language 34 described above, and provides for the printhead controller 36 (including and reconfigured by the new ASIC 38) to receive the same mid-level communication interface language 34 (as is depicted in FIG. 2), but to responsively provide the command signals 40 required for the new printing cartridge. Thus, the printer 10 enjoys a flexibility of use, and an upgrade capability not previously known in the inkjet printer art.

Those skilled in the art will further appreciate that the present invention may be embodied in forms other than the exemplary preferred embodiment described herein without departing from the spirit or central attributes thereof. Because the foregoing description of the present invention discloses only a particularly preferred exemplary embodiment of the invention, it is to be understood that other variations are recognized as being within the scope of the present invention. Accordingly, the present invention is not limited to the particular embodiment which has been described in detail herein. Rather, reference should be made to the appended claims which define the spirit and scope of the present invention.

The inventiion claimed is:

1. A printer apparatus translating high-level printing signals received by the printer from a source of these signals and responsively providing control signals effecting actions of the printer, said printer apparatus comprising:

print formatter circuit means receiving high-level printing signals communicating from a host computer unit and responsively outputting a mid-level interface communication signals including print data and print data register addresses;

printhead controller circuit means in the form of an ASIC that is removable to accept and utilize a substitute ASIC for receiving said output from said print formatter circuit, and responsively providing low-level discreet control signals controlling printing actions of a printhead.

2. A printer apparatus according to claim 1, wherein said printhead controller circuit means includes an application specific integrated circuit (ASIC) including functions, instructions and algorithms for translating said mid-level interface communication signals into said low-level control signals.

3. A printer apparatus according to claim 1, wherein said ASIC includes a function allowing identification of a printhead type currently installed in the printer.

4. A printer apparatus according to claim 1 wherein said printhead controller circuit ASIC further allows said printhead controller circuit to control a temperature of said printhead.

5. A printer apparatus according to claim 1 wherein said printhead includes a plurality of printing orifices, and said ASIC provides a "orifice select" signal indicative of a particular one of said plurality of orifices from which ink is to be ejected.

6. A printer apparatus according to claim 1 wherein said intermediate level communication interface provides exclusive communication between said print formatter circuit and said printhead controller circuit.

7. A method of inkjet printing with an inkjet printhead having plural orifices from which print fluid is selectively ejected individually onto print medium, said method comprising steps of:
providing a print formatter circuit for receiving high-level printing signals and responsively outputting both print data and print register addresses;
providing a printhead controller circuit receiving said print data and said print register addresses, responsively outputting control signals to said print head for effecting ejection of printing fluid therefrom;
including in said control signals an "orifice select" signal, and utilizing said "orifice select" signal to select from among said plural orifices of said printhead a single orifice from which printing fluid is ejected individually; and
including in the control signals an "energy dissipation" control signal, and utilizing said "energy dissipation" control signal to control an energy level provided at said selected single orifice for ejecting printing fluid therefrom.

8. The method of claim 7 further including the step of providing said printhead controller circuit with an application specific integrated circuit (ASIC).

9. The method of claim 8 including the step of providing for said ASIC to be removed from said printer, and to be replaced with an updated new ASIC.

10. The method of claim 7 further including the step of including in said control signals a "temperature level interrogation" signal, and utilizing said "temperature level interrogation" signal to assess a temperature of operation of said printhead.

11. A method of operating an inkjet printing apparatus receiving high-level printing signals from a source of these signals and responsively providing control signals effecting actions of the printer, said method comprising steps of:
providing a print formatter circuit receiving the high-level printing signals and responsively outputting mid-level interface communication signals including print data and print data register addresses;
providing a printhead controller circuit means in the form of an ASIC that is removable to accept and utilize a substitute ASIC for receiving the mid-level interface communication signals and responsively providing low-level discreet-action control signals directly effecting printing actions of an inkjet printhead.

12. The method of claim 11 including the steps of providing for said ASIC to include functions selected from the group consisting of:
Nozzle_select, Energy_management, Encoder_signal Temperature_management, Horizontal_alignment, Vertical_alignment, and Timing_control; in which the function Nozzle_select informs an inkjet printhead which one or ones of the plurality of respective nozzles are to discharge a minute jet of printing fluid; the function Energy_management regulates an amount of power dissipated at a selected one of the plural nozzles;
the function Encoder_signal provides for location of the lateral position and direction of movement of a print head;
the function Temperature_management monitors a temperature of the printhead, the function Horizontal_alignment directs a printhead traverse mechanism of the inkjet printing apparatus to laterally align the printhead on print medium;
the function Vertical_alignment directs a print medium feed mechanism of the printing apparatus to align the print medium along a printing path; and
the function Timing_control synchronizes movements of the print medium feed mechanism, the printhead traverse mechanism, and other printing events.

13. The method of claim 12 further including the steps of providing for said ASIC to include functions selected from the group consisting of:
Printhead_identifier, Reset_sequencing, Continuity_testing, and Printhead_cleaning; and in which the function Printhead_identifier identifies a particular printhead installed in the printing apparatus, and provides an indication of the correct instruction set to be used for that printhead; the function Reset_sequencing resets the printhead to an initial starting condition if necessary; the function Continuity_testing verifies an electrical interface between the printhead controller circuit and the printhead; and the function Printhead_cleaning causes the printhead controller circuit to clean the nozzles of the printhead by ejecting bursts of ink jet ejections of pre-determined strength and intensity.

14. The method of claim 11 including the step of utilizing the intermediate level communication interface between the print formatter circuit and the printhead controller circuit as the exclusive communication of data, address, command, and information signals between these circuits.

15. A printer interface, comprising:
means for receiving high-level printing signals and responsively outputting both print data and print register addresses; and
means for receiving said print data and said print register addresses including a printhead controller circuit means in the form of an ASIC that is removable to accept and utilize a substitute ASIC, and responsively outputting control signals to effect printing fluid discharge in a controlled manner.

16. A method of printing, comprising:

receiving high-level printing signals and responsively outputting both print data and print register addresses; and receiving said print data and said print register addresses using a printhead controller circuit means in the form of an ASIC that is removable to accept and utilize a substitute ASIC, and responsively outputting control signals to effect printing fluid discharge in a controlled manner.

17. A printer interface, comprising:

means for receiving high-level printing signals and responsively outputting mid-level interface communication signals including print data and print data register addresses; and means for receiving the mid-level interface communication signals addresses including a printhead controller means in the form of an ASIC that is removable to accept and utilize a substitute ASIC, and responsively providing low-level discrete-action control signals directly effecting printing actions of an inkjet printhead.

18. A printing method, comprising:

receiving high-level printing signals and responsively outputting mid-level interface communication signals including print data and print data register addresses; and receiving the mid-level interface communication signals addresses including a printhead controller circuit means in the form of an ASIC that is removable to accept and utilize a substitute ASIC, and responsively providing low-level discrete-action control signals directly effecting printing actions of an inkjet printhead.

19. A method for printing, comprising:

translating high-level printing signals to intermediate-level interface communication signals including print data and print data register addresses, wherein the translation between high-level printing signals to intermediate-level interface communication signals includes using a print formatter circuit;

translating intermediate-level interface communication signals to low-level printing signals, wherein the translation between intermediate level printing signals to low-level discreet control signals includes using a printhead controller circuit means in the form of an ASIC that is removable to accept and utilize a substitute ASIC, and responsively providing low-level discreet control signals for controlling a printhead, wherein responsively providing-low level discreet control signals includes utilizing the removable ASIC such ASIC providing configuration signals for allowing a different printhead to adapt to printer controls and printer control signals in a printer.

20. A method of inkjet printing with an inkjet printhead having plural orifices from which print fluid is selectively ejected individually onto print medium, said method comprising steps of:

providing a print formatter circuit for receiving high-level printing signals and responsively outputting both print data and print register addresses;

providing a printhead controller circuit means in the form of an ASIC that is removable to accept and utilize a substitute ASIC, for receiving said print data and said print register addresses; and responsively outputting control signals to said print head for effecting ejection of printing fluid therefrom.

* * * * *